Nov. 29, 1932.  S. F. ARBUCKLE  1,889,623
COMBINED LIGHT AND SIGNAL
Filed April 11, 1922
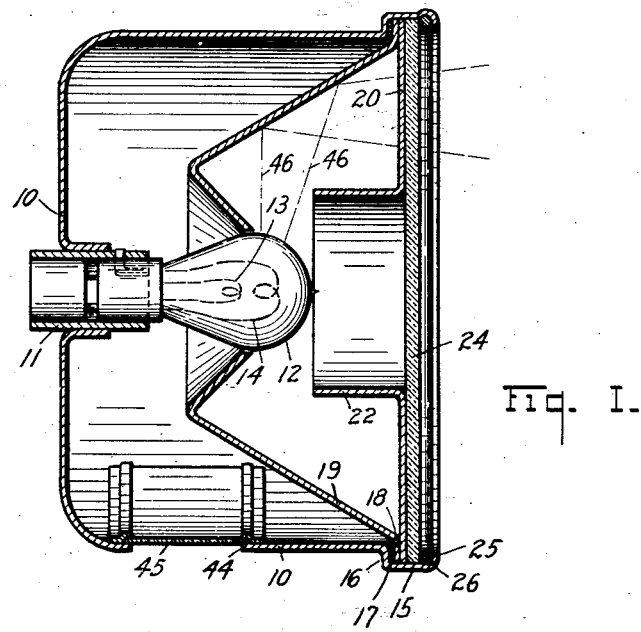
Fig. I.
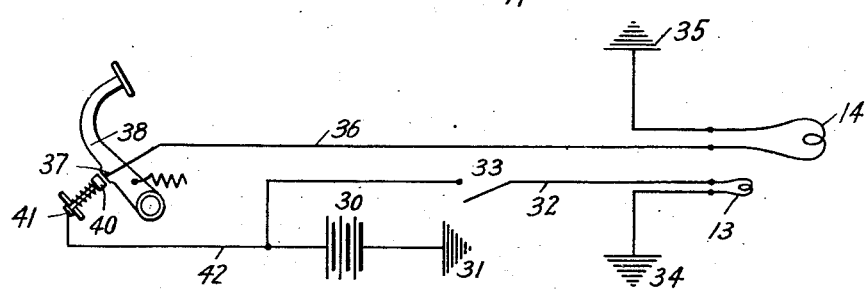
Fig. II.
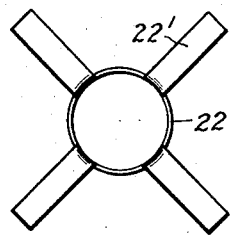
Fig. IV.
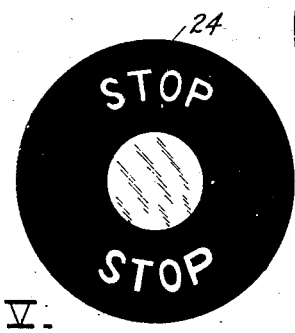
Fig. V.
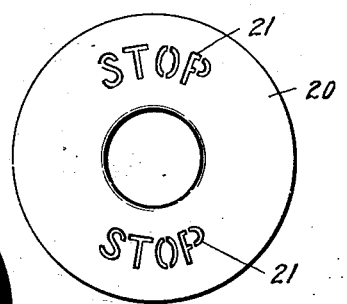
Fig. III.
INVENTOR.
Samuel F. Arbuckle
BY Chester H Braulton
ATTORNEYS.

Patented Nov. 29, 1932

1,889,623

UNITED STATES PATENT OFFICE

SAMUEL F. ARBUCKLE, OF DETROIT, MICHIGAN, ASSIGNOR TO S. F. ARBUCKLE CORP., A CORPORATION OF DELAWARE

COMBINED LIGHT AND SIGNAL

Application filed April 11, 1922. Serial No. 551,646.

The present invention relates to a combined light and signal such as a tail light on an automobile and a stop signal, an object of the invention being to provide a unitary structure with no moving parts for performing both functions either of which may be operated simultaneously with the other, or separately.

Various other objects are within the scope of this invention such as relate to the arrangement of the related elements or the structure, and to various details of construction and to economies of manufacture and numerous other features as will be apparent from a consideration of the drawing and related description of a form of the invention, which may be preferred.

Referring to drawing,

Fig. I is a vertical sectional view of one embodiment of the invention taken through the longitudinal axis thereof;

Fig. II is a diagrammatic view of the electric circuits to be used in connection with the device shown in Fig. I;

Fig. III is a front elevation of the plate or stencil used in connection with the device shown in Fig. I;

Fig. IV is a modification of the part shown in Fig. III;

Fig. V is a diagrammatic face view of the device shown in Fig. I and showing how the signal and light portions thereof appear when simultaneously illuminated.

Referring to Fig. I, I have provided a casing 10, a lamp socket 11 adapted to receive a lamp 12. The lamp 12 has a plurality of filaments 13 and 14 adapted to receive current from two different circuits as will appear. The casing 10 is expanded at 15 to form a ledge 16 within which rests a packing ring 17, and the flange 18 of a reflector 19. This reflector 19 constitutes the embodiment of means cooperating with the two sources of illumination whereby a unitary combined light and signal may be produced. The reflector 19 is shaped in this instance as shown to reflect forwardly rays of light from the filament 14 but intercepts or is so arranged as to prevent or at least diminish, in combination with the shield hereinafter described, the passage of rays of light from filament 13 to the outer portion of the lens of the lamp.

A combined stencil plate or signal and shield 20 overlaps the flange 18 of reflector 19 and is provided with openings 21 indicating "stop", for example, the combined stencil plate and shield having a central inwardly extending cylindrical portion 22, it being apparent that the entire signal plate and shield 20 may be stamped from a disk plate. The portion 22 is of sufficient length to shield rays of light from filament 13 from passing directly through the signal 21.

The glass or lens 24 which is usually colored red, extends into the expanded portion 15 of the casing and the reflector 19, signal 20 and glass lens 24 may be held in place by use of a clamping ring 25 which fits in a spun in groove 26 in the extension 15 of the casing 10.

Referring to Fig. II, it will be seen that the filament 14 is in a brake control circuit while filament 13 is in an ordinary tail light circuit which is here illustrated as including a battery 30, grounded at 31 with a single wire circuit, line 32 containing switch 33, the filament 13 being grounded as indicated at 34.

The filament 14 is grounded at 35 while a wire 36 leads to the contact 37 on the brake pedal 38. Suitably located in the path of travel of contact 37 on the brake pedal is a contact 40, carried by a movable spring pressed plunger 41 from which a lead 42 leads to the battery. Any desired circuit arrangements may be used as desired.

The casing 10 may be provided with an opening 44 for illuminating a license number plate through a clear glass or transparency 45.

The operation will be understood from the foregoing. On closing switch 33 the filament 13 is illuminated and rays of light therefrom pass through the central unobstructed portion of the glass 24. The reflector 19 prevents or at least cuts down the reflection of rays of light from the filament 13 through the letters 21 of the signal 20 while the shield 22 will block the direct passage of rays of light from filament 13 therethrough. Thus rays of light from the filament 13 are projected rearwardly as in ordinary tail lights on automobiles.

When the operator depresses the brake pedal 38, the other circuit 36 for filament 14 is energized and remains energized during a considerable range of the brake application, with a result that rays of light indicated at 46 from the filament 14 are reflected by the reflector 19 through the signal 20. The signal is thus independently illuminated, whether the filament 13 or ordinary rear light is in operation or not and each may be independently operated in use in the day time or during night driving and a combined structure is at the same time provided. That portion of the rays of light from the filament 14 passing through that portion of the lens 24 bounded by the cylindrical portion 22 acts to intensify the illumination thereof sufficiently to serve, in itself, the purpose of a stop light.

In Fig. IV the shield 22 is separately held in position by arms 22'. In this case it will be apparent that substantially the entire area of the lens 24 will be illuminated when the filament 14 is energized.

It is apparent that, within the spirit of the invention, modifications and different arrangements may be made other than as herein disclosed, and the present disclosure is illustrative merely, the invention comprehending all variations illustrated.

What I desire to claim and secure by Letters Patent of the United States is:

1. In a combined tail light and signal light, a casing having two openings for emitting light, two light sources in a single bulb, both sources being positioned directly in back of one of said openings and adapted to project light therethrough, a separate circuit for each of said sources, means for energizing one of said circuits independently of the other thereof, means for directing light from one of said sources through the other of said openings, and means for limiting the passage of light from the other of said sources through the last mentioned opening.

2. The combination with a vehicle tail and signal light, a housing, a closure for said housing having a light penetrable area, a bulb having a plurality of filaments therein positioned in said housing, one of which is capable of producing a light operable to signal a change in movement of the vehicle and another of which is capable of producing light to give a tail light indication at night and arranged to directly illuminate said area with any one of said filaments, and a separate circuit for each of said filaments operable at will whereby the intensity of illumination of said area may be varied for signal purposes.

3. The combination with a vehicle tail and signal light, a housing, a closure for said housing having a light penetrable area, a bulb having a pair of filaments therein of different capacities one of said filaments being capable of producing a light of relatively great brilliancy operable to signal a change in movement of the vehicle and the other of said filaments being capable of producing a light of less brilliancy to give a normally lighted tail-light indication at night, said bulb being positioned in said housing and arranged to illuminate said area with either of said filaments, a separate circuit for each of said filaments, and means operable at will to close either one or both of said circuits whereby to vary the intensity of illumination of said area for signal purposes.

4. A device of the kind described, comprising a casing, a light penetrable member closing one end of said casing, two selectively and independently energizable light sources arranged in axial alignment within said casing, reflecting means for reflecting light from one only of said sources through the outer portions of said member, and means to limit the passage of light from the other of said source through the outer portions of said member, both of said sources being arranged to directly illuminate the central portion of said member.

5. A device of the kind described, comprising a casing, a light penetrable wall closing one end of said casing, an opaque member arranged adjacent said wall and perforated to provide suitable indicia outwardly of its center, said member having a central opening and an axially projecting hollow shield, two selectively and independently energizable light sources within said casing, one of said sources co-operating with said shield substantially to illuminate said wall through said central opening only, the other of said sources being positioned to directly illuminate said wall through said central opening, and reflecting means co-operating with the other of said sources for illuminating said wall through said perforations.

6. The combination with a vehicle tail and signal light, a casing, a translucent wall in said casing, a bulb in said casing having two selectively and independently energizable filaments, one of which is capable of producing light to signal a change in movement of the vehicle and the other of which is capable of producing light to give a normally lighted tail-light indication at night, means for restricting substantial illumination of said wall by one of said filaments to a portion only of said wall while permitting the other filament to illuminate substantially all of said wall, the other of said filaments being so related to said means as to illuminate, when energized, the remaining portion of said wall, and means for energizing said filaments.

7. The combination with a vehicle tail and signal light, a casing, a translucent wall in said casing, a bulb in said casing having two selectively and independently energizable filaments, one of which is capable of producing light to signal a change in movement of the vehicle and the other of which is capable of producing light to give a normally lighted tail-light indication at night, means for restricting substantial illumination of said wall by one of said filaments to a portion only of said wall while permitting the other filament to illuminate substantially all of said wall, the other of said filaments being so related to said means as to illuminate all of said wall when energized, and means for energizing said filaments.

8. The combination with a vehicle tail and signal light, a casing, a light penetrable wall in said casing, a bulb in said casing having two selectively and independently energizable filaments arranged to directly illuminate said wall, one of said filaments being operable to produce a light to signal a change in movement of the vehicle and another of which is capable of producing a light to give a tail-light indication at night and baffling means in said casing restricting material illumination of said wall by one of said filaments to a portion only thereof while permitting the other filament to illuminate substantially all of said wall.

9. The combination with a vehicle tail and signal light, a casing, a light penetrable wall in said casing, a bulb in said casing, a pair of spaced selectively and independently energizable light sources in said bulb, baffling means within said casing restricting substantial illumination of said wall by one of said sources to a portion only of said wall, and reflecting means in said casing for directing rays from said other of said sources to the portion of said wall not illuminated by the first said source.

10. In combination, a casing, a light penetrable wall in said casing, two selectively and independently energizable sources of illumination in said casing confined in a single bulb and each arranged to illuminate said wall, and baffling means in said casing restricting substantial illumination of said wall by one of said filaments to the central portion only thereof without restricting the illumination of said wall by the other of said sources.

11. The combination with a vehicle tail and signal light, a casing, two separate light penetrable areas in said casing one employed principally for tail light purposes and the other thereof for signalling purposes other than a tail light, an electric light bulb in said casing having a plurality of separately and independently energizable filaments therein for direct illumination of said tail light area, said signal light area being illuminated principally by indirect illumination, and means for energizing said filaments.

12. A lamp for warning and signal purposes including, in combination, a casing, a light penetrable closure for said casing, an electric light bulb within said casing having a pair of selectively and independently energizable filaments therein, baffling means within said casing cooperating with said filaments to restrict the area of illumination of said closure by one of said filaments, and to permit the illumination of the area by the other of said filaments.

13. A lamp for warning and signal purposes including, in combination, a casing, a light penetrable closure for said casing, part of the area of which is adapted to form a tail light, an electric light bulb within said casing having a pair of selectively or independently energizable filaments therein, and means cooperating with said bulb to restrict substantially all of the light from one of said filaments to said tail light area of said closure while permitting the passage of light from the other of said filaments to the entire area of said closure.

14. The combination with a vehicle tail and signal light, a housing, a closure therefor having a light penetrable area, a light bulb in said housing having a pair of filaments therein each arranged for direct illumination of said area, circuits connecting said filaments to a source of current, and means operable at will for completing said circuit to one and/or the other of said filaments to vary the intensity of illumination of said area for warning and/or signal purposes.

15. The combination with a vehicle tail and signal light, a casing, a light-penetrating closure for said casing, a receptacle mounted on said casing, a bulb supportable in said receptacle, two independently energizable filaments in said bulb, a source of current for energizing said filaments, control means for connecting said source to one of said filaments for effecting its energization to produce a light for warning purposes, and additional means for simultaneously connecting said source to the other of said filaments to produce a light for signal purposes.

16. The combination with a vehicle tail and signal light, a casing, a light-penetrating closure for said casing, a receptacle mounted on said casing, a bulb supportable in said receptacle, two independently energizable filaments in said bulb, a source of current for energizing said filaments, control means for connecting one and/or the other of said filaments for effecting the energization thereof for producing light for warning and/or signal purposes.

17. The combination with a vehicle tail and signal light, a casing, a light-penetrable closure for said casing, a receptacle mounted on said casing, a bulb supportable in said receptacle, two independently energizable filaments of different luminous intensity in said bulb, a source of current for energizing said filaments, and means for selectively controlling the flow of current to said filaments to enable the intensity of illumination of said closure to be varied for warning and/or signal purposes.

18. In combination with a tail and signal light, a casing, a closure for said casing for emitting colored light therefrom, a receptacle mounted on said casing, a bulb supported in said receptacle, two independently energizable filaments of different light producing intensities in said bulb, one of said filaments producing a light operable to signal a change in movement of the vehicle and the other of said filaments being capable of producing a light to give a normally lighted tail-light indication, a source of current, and means for selectively connecting the filaments to the source to energize one and/or the other of the filaments.

19. In combination with a tail and signal light, a casing, a closure for said casing for emitting colored light therefrom, an aperture in the wall of said casing, a window enclosing said aperture, a receptacle mounted on said casing, a bulb supported in said receptacle, two independently energizable filaments in said bulb, one of said filaments producing a light operable to signal a change in movement of the vehicle and the other of said filaments being capable of producing a light to give a normally lighted tail-light indication, a source of current, and means for selectively connecting the filaments to said source to simultaneously illuminate said window and closure at different intensities.

20. In combination with a tail and signal light, a casing, a closure for said casing for emitting colored light therefrom, an aperture in the wall of said casing, a window enclosing said aperture, a receptacle mounted on said casing, a bulb supported in said receptacle, independently energizable filaments of different light producing intensities in said bulb, one of said filaments producing a light operable to signal a change in movement of the vehicle and the other of said filaments being capable of producing a light to give a normally lighted tail-light indication, a source of current, and means for selectively connecting the filaments to said source to simultaneously illuminate said window and closure to any one of three different degrees of light intensity.

21. In combination with a tail and signal light, of an incandescent light bulb therein having one filament which produces light of relatively great brilliancy operable to signal a change in movement of the vehicle during the day and at night, and a second filament in said bulb which produces light of less brilliancy to give a normally lighted tail light indication at night, and means for selectively energizing said filaments.

In testimony whereof, I affix my signature.

SAMUEL F. ARBUCKLE.